(12) United States Patent
Boyer (10) Patent No.: US 7,327,869 B2
(45) Date of Patent: Feb. 5, 2008

(54) COMPUTER AIDED QUALITY ASSURANCE SOFTWARE SYSTEM

(75) Inventor: Mark J. Boyer, Placentia, CA (US)

(73) Assignee: The Boeing Company, Chicago, IL (US)

( * ) Notice: Subject to any disclaimer, the term of this patent is extended or adjusted under 35 U.S.C. 154(b) by 751 days.

(21) Appl. No.: 10/873,720

(22) Filed: Jun. 21, 2004

(65) Prior Publication Data

US 2005/0281453 A1    Dec. 22, 2005

(51) Int. Cl.
G06F 17/50 (2006.01)
G06F 9/45 (2006.01)
G06F 19/00 (2006.01)

(52) U.S. Cl. .................. 382/141; 716/1; 717/100; 700/182

(58) Field of Classification Search ............... 382/141, 382/147, 151, 152, 305; 703/2, 7, 8, 22–28; 717/105, 109, 113, 125, 100; 702/82, 182, 702/150, 155, 83; 716/1, 4–6, 11; 345/156, 345/676; 706/45–47; 33/503, 559, 556, 33/1 PT, 1 N; 700/245, 182, 161, 160, 173
See application file for complete search history.

(56) References Cited

U.S. PATENT DOCUMENTS

| 4,513,316 | A  | * | 4/1985  | Kobayashi et al. | 348/133 |
|-----------|----|---|---------|------------------|---------|
| 5,434,805 | A  | * | 7/1995  | Iwasaki          | 702/117 |
| 5,465,221 | A  | * | 11/1995 | Merat et al.     | 702/83  |
| 5,903,459 | A  |   | 5/1999  | Greenwood et al. |         |
| 6,063,132 | A  | * | 5/2000  | DeCamp et al.    | 716/5   |
| 6,612,044 | B2 | * | 9/2003  | Raab et al.      | 33/503  |
| 6,796,048 | B2 | * | 9/2004  | Steffey et al.   | 33/503  |
| 6,820,346 | B2 | * | 11/2004 | Raab et al.      | 33/503  |
| 6,931,573 | B2 | * | 8/2005  | Adams et al.     | 714/38  |
| 7,240,309 | B2 | * | 7/2007  | Saito et al.     | 716/5   |
| 2003/0233199 | A1 | * | 12/2003 | Raab           | 702/33  |
| 2004/0035014 | A1 | * | 2/2004  | Raab et al.    | 33/503  |

* cited by examiner

*Primary Examiner*—Sheela C Chawan
(74) *Attorney, Agent, or Firm*—Jonathan W. Hallman; MacPherson Kwok Chen & Heid LLP (57) ABSTRACT

A software system including simulation routines embedded inside a computer aided drafting (CAD) platform. The routines simulate the inspection processes prior to the execution of the physical inspection process. The simulator works within the host CAD platform and drives a three dimensional probe through a numerically defined inspection path of inspection points and vectors with specified clearance geometry included.

20 Claims, 9 Drawing Sheets

COMPUTER AIDED QUALITY ASSURANCE SOFTWARE SYSTEM

TECHNICAL FIELD

The present invention relates generally to a computer software system, and more specifically to a computer software system which provides technological synchronization, geometric associativity, and collaboration during a manual or digital inspection process of manufactured products.

Large purchasers of manufactured products rely heavily on quality assurance programs to ensure that the products they are buying are being reproduced with consistent quality. Product suppliers, however, use different electronic verification and validation software systems to check the quality of the fabrication or manufacturing process. The different software systems within the manufacturing and fabrication process have the potential of producing anomalies within the inspection data and geometry of the products, thus, hindering the accuracy of the qualification data and the in-process or final inspection processes. In addition, multiple types of output and different systems between numerous suppliers cause lengthy analysis and integration times.

As a result, processes are needed that provide common technology to drive all of the aspects of technological synchronization and geometric associativity within the supplier chain of activities during the inspection, validation, and approval processes.

SUMMARY

Systems and methods are disclosed herein for an enterprise-level process that provides common technology to drive all of the aspects of technological synchronization and geometric associativity within the supplier chain of activities during the inspection, validation, and approval processes to remain competitive, reduce costs, and increase product quality at the suppliers.

The software system generates Dimensional Measuring Interface Standard (DMIS)—ANSI-CAM-I-101 Compliant Coordinate Measurement Machine (CMM) programs. The software system is developed with embedded architectural qualities, such that the DMIS files and all of the validation and inspection geometry are completely associative to the product definition within the Computer Aided Drafting (CAD)/Computer Aided Manufacturing (CAM) system.

The software system of the present invention also generates Electronic Data Inspection (EDI) files that are compatible with all CMM systems and other numerically integrated measurement systems. These programs generate numerical files that are in ASCII format for manual or automated precision inspection machines.

The software system of the present invention provides embedded simulation routines of the entire inspection processes prior to the execution of the inspection process inside a CAD system. This simulator works within the host CAD/CAM platform and drives a three dimensional probe through a numerically defined inspection path of inspection points and vectors with specified clearance geometry included.

The software system is designed to provide users with all of the necessary tools and aspects of Quality Assurance and inspection processes that are typically encountered during a model-based digital or manual (drawings) approval and acceptance process.

Other capabilities include the ability to create associative Quality Assurance (QA) drawings and measurement set-up sketches for the electronic, bench or mixed inspection processes. This system generates ANSI compliant drawing templates within the CAD/CAM platform that are completely associative to the model definition. This system also provides functionality that develops inspection plans in a concurrent manner with the CMM programming system. This system has the capability of performing differing types of analysis on measurement data on complex parts; manage quality files in an associative manner; generate statistical process control (SPC) data and graphs from inspection and validation processes; import/export data files to and from other measurement systems and CAD/CAM platforms; manage quality assurance performance with a web based reporting system; and provide an outlined model for procedural compliance with a predetermined set of standards.

The process of the present invention provides a common technology to drive all of the aspects of technological synchronization and geometric associativity within the supplier chain of quality assurance activities.

In one aspect of the invention, a method is provided for inspecting a product. The method includes receiving a first data package including a first digital definition of a subject product; merging the first data package into a native CAD platform; generating an integrated inspection plan for the first digital definition; generating an inspection plan routine based on the integrated inspection plan; instructing a CMM to perform an interrogation of a manufactured version of the subject product in response to the inspection plan routine; receiving a second data package generated by the CMM in response to the interrogation; merging the second data package into the native CAD platform; and comparing the first data package to the second data package to determine a level of deviation between the first data package and the second data package.

In another aspect of the invention, a system is provided for inspecting a product. The system includes a quality assurance software system configured to operate as an integral part of the native CAD platform. The quality assurance software system is configured to: receive a first data package including a first digital definition of a subject product; generate an integrated inspection plan for the first digital definition; generate an inspection plan routine based on the integrated inspection plan; instruct a CMM to perform an interrogation of a manufactured version of the subject product in response to the inspection plan routine; receive a second data package generated by the CMM in response to the interrogation; merge the second data package into the native CAD platform; and compare the first data package to the second data package to determine a level of deviation between the first data package and the second data package.

The present invention provides an improvement in the quality of products that are received by a purchaser from a supplier, which uses the software system noted herein.

The supplier using the software system of the present invention is benefited since the software system improves the overall quality of the product, increases the quality of the product parts, increases effectiveness and efficiency of QA, shortens the time span between the inspection process and product delivery, facilitates proper QA file archival and extraction, reduces training/labor costs, reduces CMM programming time, and reduces the QA inspection time.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides a computer aided-quality assurance (CA-QA) software system designed to operate as an embedded tool from within a CAD/CAM systems environment for the purpose of utilization during the Quality Assurance and Validation processes.

In one embodiment, the CA-QA software system is designed and compiled to be forward and backward version compatible within the CAD/CAM environment of various versions of CAD/CAM software. This is accomplished due to the embedded architectural format and the specific dynamically linked libraries (DLLs) that are written for the software into the executable code. For example, on the Unigraphics CAD/CAM platform, the CA-QA software system may be compiled once for version 18.0, version NX or version NX2. It may also be compiled for NX2 and then used on Version 18.0. Unigraphics is available commercially from UGS Incorporated.

Although, the CA-QA software system is hereafter described as being embedded with the UGS v18.0 Unigraphics CAD/CAM platform, it should be understood that the CA-QA software system and other CAD platforms, such as CATIA or PRO-E, may be configured together to provide the same substantive results.

In one embodiment, the operation of the CA-QA software system embedded in the Unigraphics environment can operate with the following system requirements.

In this embodiment, the CA-QA operates using a Microsoft® Windows® operating system, such as Windows® 2000, XP, or NT and the like. In addition, other Microsoft® products, such as Microsoft Office Tools, Word® and Excel® are also used to provide various text and spreadsheet functionalities to allow the CA-QA software system to operate in a more integrated fashion with the office environment. It should also be understood that other word processing and spreadsheet platforms can be configured with the CA-QA software system to provide the same basic functionalities.

All hardware specifications should be focused towards the support of the user's CAD/CAM platform environment, for example in this embodiment, a Unigraphics CAD/CAM platform. In this embodiment, approximately 70 megabytes of hard disk drive memory space is used to load the CA-QA software system and its associated library files.

The CA-QA software system is initially installed onto a computer using a commercially available software installer program. In one embodiment, the following files are downloaded into a Windows® based directory entitled CA-QA on the computer or workstation during the installation:

1) A sub-directory NT_DEPLOY_FILES
  a. readme.doc
  b. install.doc
  c. quality.tbr
  d. quality.utd
  e. spc_start.doc
  f. ug_standard.tbr
  g. wcs.tbr
2) Tertiary Directories/Files under NT_DEPLOY_FILES entitled:
  a. Administration (Directory)—containing four (4) files
  b. Delivery directory—contains (12) files
  c. demo (Directory)—180 files
  d. formats (Directory)—containing 50 geometry part files
  e. NT_tools (Directory)—contents are 10 C++ exec files, 3 DLL files, one MS Word file entitled QAIP.doc, one MS Word file entitled plan.doc a file entitled qalib.h, and a sub-directory entitled QA-icons containing 10*.bmp files
  f. process (Directory)—containing 63 MS Word files.
  g. spc start (Directory)—25 files
  h. web_library (Dir)—208 files These files are hard coded and linked together to provide the user with complete associativity to the actual CAD/CAM systems environment.

The CA-QA software provides two graphical user interface tool options, a dockable tool bar and a user tools dialogue (UTD) menu, to use with the host CAD/CAM system.

Figure 1:
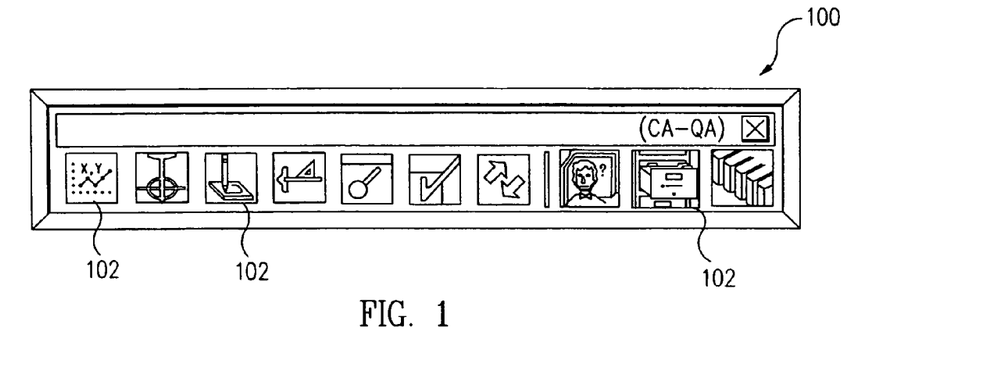
FIG. 1 shows a graphical user interface in accordance with an embodiment of the present invention.

As shown in FIG. 1, the architecture of the CA-QA software system of the present invention provides a graphical user interface (GUI) 100, which appears seamless to the user while the user is operating the CAD/CAM software package.

In one embodiment, GUI 100 is an icon-based interface, where each icon 102 allows for the selection of any of the modules and routines available for utilization. The modules and routines are described in greater detail below.

The modules guide the user to a number of secondary modules within the system.

Figure 2A:
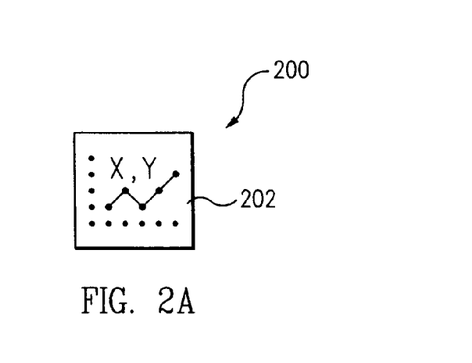
FIG. 2A shows a graphical icon in accordance with an embodiment of the present invention.

FIG. 2A is a representation of one icon 200 from GUI 100 which allows access to a module for analyzing measurement data to the nominal model or product definition geometry. The module includes a subroutine which provides an integrated data analysis process for measurement data and other large quantities of information that is to be interrogated to digital surfaces, planes, and lines.

The module also provides an embedded interface linking the CAD system platform to a Microsoft® office tools Statistical Process Control (SPC) system, such as Microsoft® Excel®. The SPC system is written as a logically embedded function, which resides within the Microsoft® Excel® environment and allows for multiple formats of measurement system data to be auto-loaded into the process. The SPC system provides table and chart enhancements to the Analysis of Variance (ANOVA) process calculations that allow multiple tests and evaluations to be performed on large quantities of measurement data. The SPC system also builds SPC charts for Bivariate, Box, Histogram, Tier, X-Bar, X-Bar/R, and X-Bar(s) type calculations as these terms are defined in statistical mathematics.

Figure 2B:
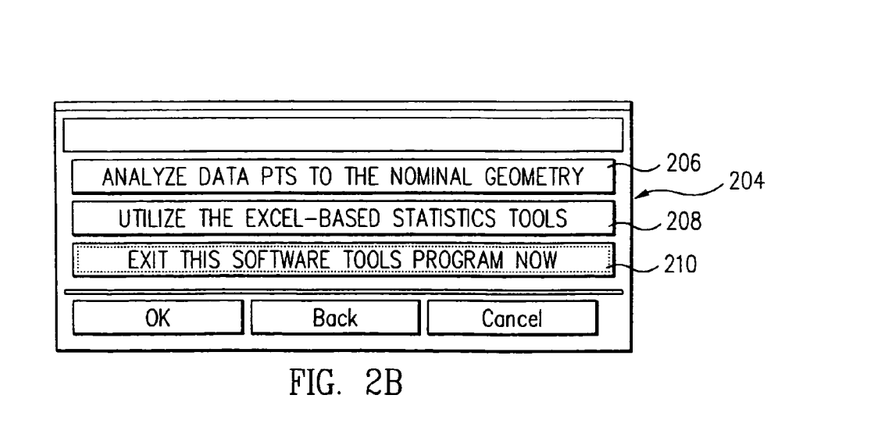
FIG. 2B shows a graphical secondary menu in accordance with an embodiment of the present invention

Upon selection of the icon button 202, main menu 204 appears, such as shown in FIG. 2B. Menu selection 206 causes a subroutine to assign specific tolerance analysis spectrums to the measurement data points as they are to be compared to the nominal geometry of a specimen. The routine then enables the user to automatically compare large data sets of points to surface(s), a plane, a line, or a master point within the embedded model geometry tolerances or specified tolerances.

Tolerance parameters and interrogation options enable the user to set all types of critical information prior to the analyzing process.

Figure 3A:
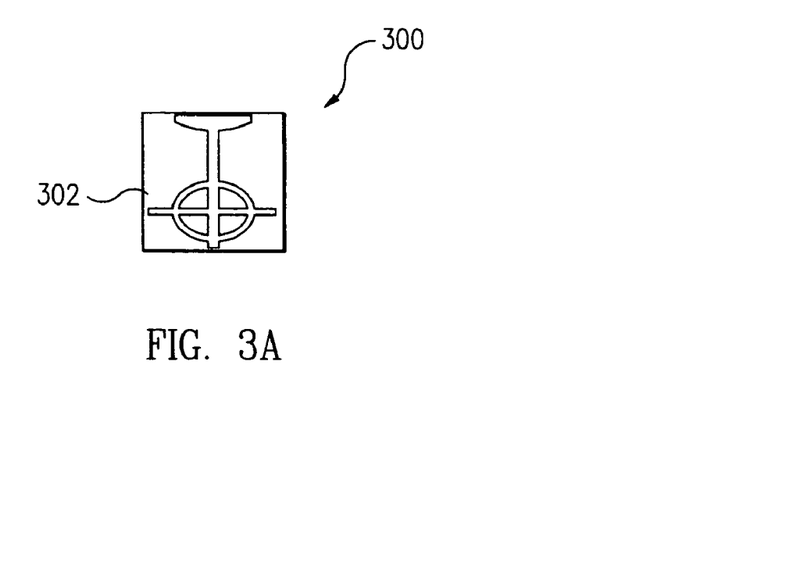
FIG. 3A shows a graphical icon in accordance with an embodiment of the present invention.
Figure 4:
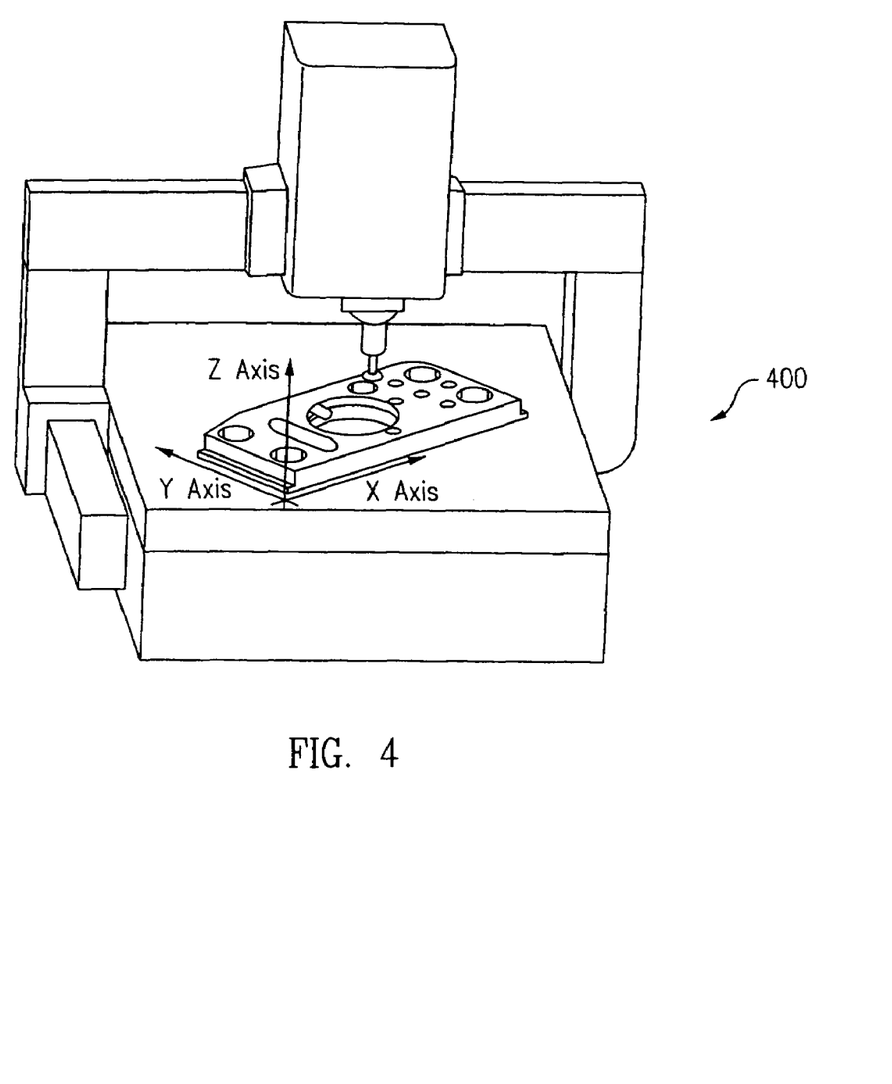
FIG. 4 is an illustration of a CMM in accordance with an embodiment of the present invention.

FIG. 3A is a representation of one icon 300 from GUI 100 which allows access to routines which provide a numeric interface to a Coordinate Measurement Machine (CMM) 400 (FIG. 4) for the electronic inspection and measurement process.

Included within the modules are the capabilities of developing inspection points, unit normals, adding avoidance geometry, probe path simulation and generation, and compatibility to the DMIS and the CMM program output format for machine specific commands.

Figure 3B:
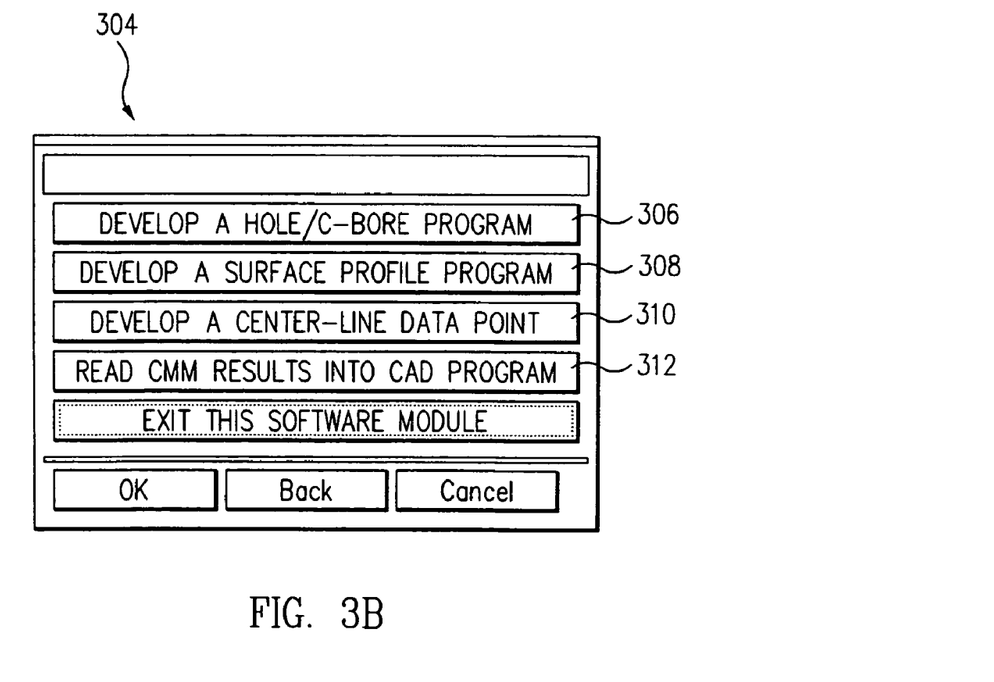
FIG. 3B shows a graphical secondary menu in accordance with an embodiment of the present invention.

Upon selection of the CMM Machine Probe Programming Module icon button 302, menu 304 appears (FIG. 3B). Menu 304 offers the selection of three programming choices, which may be used concurrently or separately depending upon the complexity of the product that is being inspected upon the CMM.

First selection 306 initiates a CMM programming inspection file for bosses and mill steps from the CAD part model. In one embodiment, the programming outfile may include as follows:

```
GOTO/-0.6148, 34.2857, -0.9953
F(INSP PT# 1.) =FEAT/POINT, CYLNDR, INNER, CART
T(INSP PT# 1.) =TOL/USETOL, CYLINDER TOLERANCE
MEAS/CYLINDER, POINT, F(INSP PT# 1.)
FEDRAT/POSVEL, IPM, 20
```

-continued

```
PTMEAS/-0.6071, 34.2857, 0.0047, -0.0077, 0.0000,
  -1.0000
ENDMES
OUTPUT/F(INSP PT# 1.)
FEDRAT/POSVEL, IPM, 10
GOTO/-0.6148, 34.2857, -0.9953
FEDRAT/POSVEL, IPM, 100
GOTO/0.1280, 34.2857, -1.0010
F(INSP PT# 2.) =FEAT/POINT, CYLNDR, INNER, CART
T(INSP PT# 2.) =TOL/USETOL, CYLINDER TOLERANCE
MEAS/CYLINDER, POINT, F(INSP PT# 2.)
FEDRAT/POSVEL, IPM, 20
PTMEAS/0.1357, 34.2857, -0.0010, -0.0077, 0.0000,
  -1.0000
ENDMES
OUTPUT/F(INSP PT# 2.)
FEDRAT/POSVEL, IPM, 10
GOTO/0.1280, 34.2857, -1.0010
FEDRAT/POSVEL, IPM, 100
GOTO/0.4994, 36.9231, -1.0039
F(INSP PT# 3.) =FEAT/POINT, CYLNDR, INNER, CART
T(INSP PT# 3.) =TOL/USETOL, CYLINDER TOLERANCE
MEAS/CYLINDER, POINT, F (INSP PT# 3.)
FEDRAT/POSVEL, IPM, 20
PTMEAS/0.5071, 36.9231, -0.0039, -0.0077, 0.0000,
  -1.0000
ENDMES
FEDRAT/POSVEL, IPM, 10
GOTO/0.1280, 42.8571, -1.0010
FEDRAT/POSVEL, IPM, 100
ENDFIL
```

Second selection 308 initiates a CMM programming inspection file for surfaces from the CAD part model. In one embodiment, the programming outfile may include as follows:

```
DMISMN/'DMIS FOR THE WIN-NT & WIN-2000 PLATFORM'
V(INSP_PTS) = VFORM/ALL
MODE/AUTO, PROG, MAN
DISPLY/TERM, V(1), PRINT, V(1), STOR, DMIS, V(1)
PRCOMP/ON
S(PROBE1) =SNSDEF/PROBE, INDEX, S(PROBE1), CART, 3, .125
SNSMNT/XVEC, 1.000, 0.000, 0.000, ZVEC, 0.000, 0.0000, 1.000,
MNTLEN, 3
FILNAM/Test_Part
PN(PART#) =PARTID/"Test_Part"
FINPOS/ON
UNITS/INCH, ANGDEC
T(SURFTOL) =TOL/PROFS,
-0.0000+0.0000, DAT(X) DAT(Y) DAT(Z)
R(DATE) =REPORT/DATE
R(TIME) =REPORT/TIME
R(TEMPF) =REPORT/TEMPF
SNSET/APPRCH, 0.2
SNSET/RETRCT, 0.2
SNSET/SEARCH, 0.2
TEXT/'CHECK CALIBRATION PRIOR TO PROG START'
FEDRAT/PCENT, 10.0
TEXT/ ' '
TEXT/' these are test comments for the run '
GOTO/0.1806, 43.0249, 1.1586
F(INSP PT# 1.) =FEAT/POINT, CART
T(INSP PT# 1.) =TOL/USETOL, LOFT SURF TOLERANCE
MEAS/POINT, F(INSP PT# 1.)
FEDRAT/POSVEL, IPM, 20
PTMEAS/0.1729, 43.0249, 0.1587, 0.0077, 0.0000, 1.0000
ENDMES
```

Third selection 310 initiates a CMM formatted center line data file. Each routine in this module provides inspection points, unit normal vector cosine values, and avoidance/clearance geometry (if requested). The clearance geometry can be established any distance from the inspection point, for example, from less than one inch to five inches or more away from the inspection point. Thus, the user accounts for the physical geometry, size and any potential interfering features when programming the inspection path and process.

In one embodiment, the routines have a three dimensional simulation routine for the user to view the exact probe inspection path within the CAD modeling environment prior to release. The simulator is made up of a series of grouped parasolids that are automatically merged into the CAD file as the software operates.

The simulator can be driven across the part inspection process using a series of dynamic work coordinate systems that move through the entire process. In operation, the user is shown the part section of interest and a simulated probe on a display screen. The probe moves across the part surface to provide a virtual inspection that the user can visualize. In this manner, if the probe were to contact an obstruction, fail to contact the part altogether or fail in some other manner, the user can correct the error before the actual inspection occurs.

The simulator offers the user the ability to key in an actual probe tip diameter and stylus length for further enhancements to the simulation process.

Fourth selection 312 causes CMM inspection results to be read into the CAD platform. The routine spatially models the x, y, and z coordinates of the actual location of the inspected item. This routine has been formatted to receive output data from the CMM in its native format without any data or formatting alterations.

Figure 5:
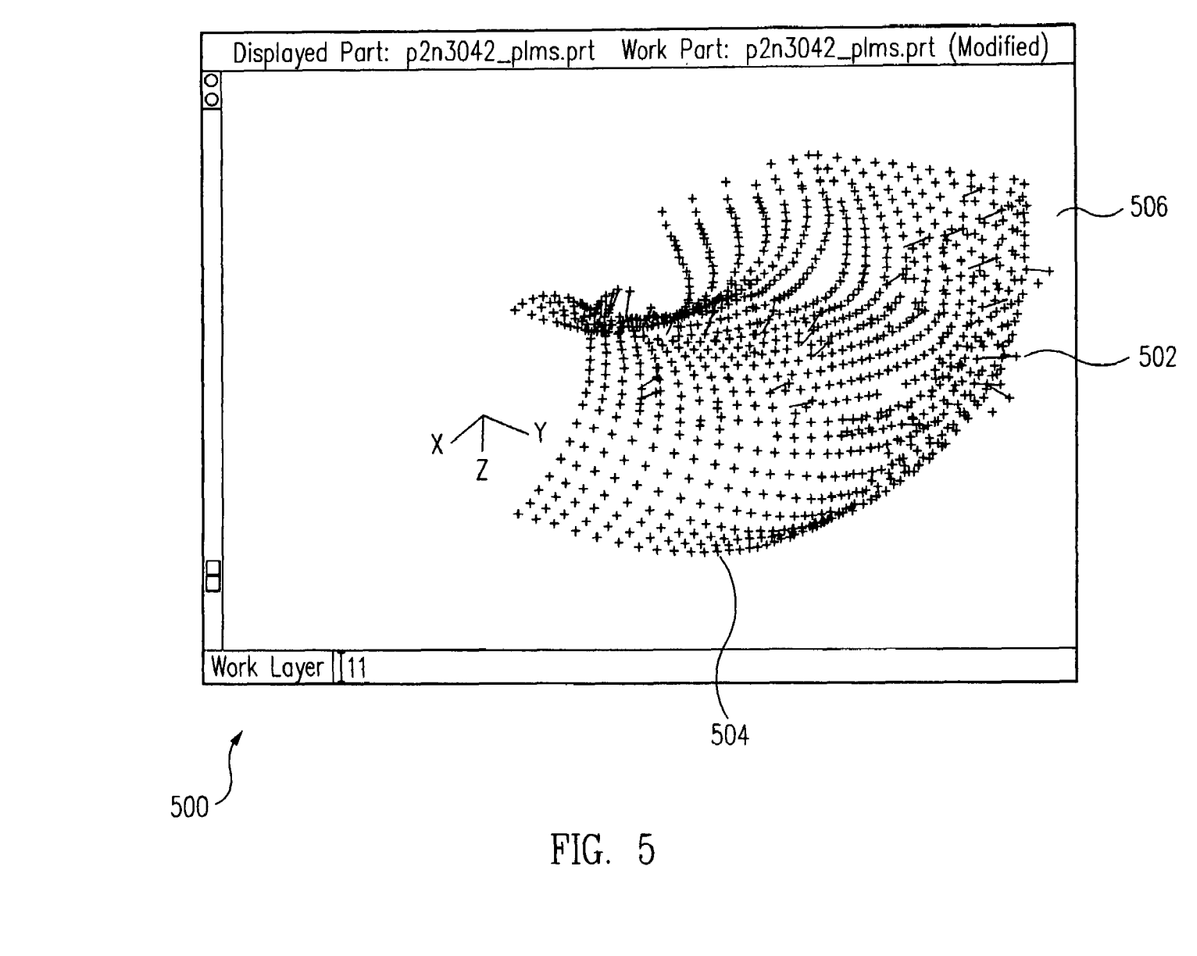
FIG. 5 is a screen shot displaying a part model as data points in accordance with an embodiment of the present invention.

FIG. 5 illustrates the display 500 of the inspection results of an analyzed part. The actual location of the inspection points are illustrated as indicators 502 relative to model part 504. Any deviation or offset of location between indicators 502 and model part 504 is illustrated with vector deviation lines 506.

Figure 6:
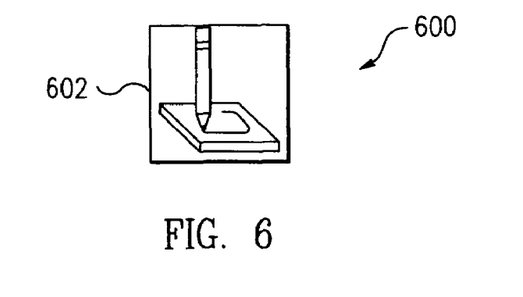
FIG. 6 shows a graphical icon in accordance with an embodiment of the present invention.

FIG. 6 is a representation of one icon 600 from GUI 100 which allows access to routines which provide a measurement planning module. The module provides an integrated approach to the electronic measurement planning cycle quality assurance organization for the inspection process. An example of this may look like:

---

MEASUREMENT POINT ID: test
MEASUREMENT POINT NUMBER: 1
TYPE OF FEATURE BEING CHECKED: PART SURFACE
TYPE OF TOLERANCE APPLIED: SURFACE PROFILE
INSPECTION POINT NOMINAL VALUES:

| X-AXIS | Y-AXIS | Z-AXIS |
|---|---|---|
| .1729 | 43.0249 | .1587 |
| I-COMPONENT | J-COMPONENT | K-COMPONENT |
| .0077 | .0350 | 0.0430 |

UPPER & LOWER DESIGN TOLERANCE
CONTROL LIMIT VALUES:

(UDL/LDL)
THE UPPER TOLERANCE CONTROL BAND = +.0000
THE LOWER TOLERANCE CONTROL BAND = −.0000

| U.D.L. | X = .1729 | Y = 43.0249 | Z = .1587 |
|---|---|---|---|
| L.D.L. | X = .1729 | Y = 43.0249 | Z = .1587 |

---

Upon selection of the measurement planning module icon button 602, inspection tables are created for each inspection or measurement point in the validation process.

In one embodiment, the inspection tables include information regarding the type of feature being checked, such as the part surface and the type of tolerance applied, such as surface profile.

The inspection tables also provide inspection point nominal values based upon the product definition geometry. For example, the inspection tables include X-AXIS, Y-AXIS, and Z-AXIS and I-COMPONENT, J-COMPONENT, and K-COMPONENT data. The inspection tables provide upper design limit (UDL) and lower design limit (LDL) tolerance limit values in the X-, Y- and Z-AXIS, as well as the tolerance control band which are also based upon the digital product definition.

Figure 7A:
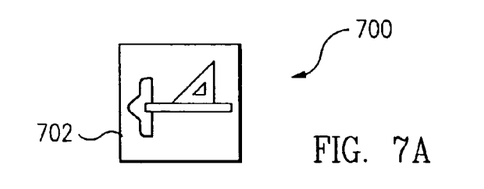
FIG. 7A shows a graphical icon in accordance with an embodiment of the present invention.

FIG. 7A is a representation of one icon 700 from which allows access to a quality assurance drawing and sketch module. The module includes routines which provide drawing and sketch interfaces to the quality assurance organization for the inspection process. The interfaces are ANSI sized boiler plate interfaces that are defined as prn or prt files. The files can be auto-merged into the existing model file and thus, provide for complete geometric associativity in the CAD/CAM platform.

Included within the module is the ability to develop 8.5×11, 11×17, or other sized drawings, reports, and the like as well as output for machine specific commands.

Figure 7B:
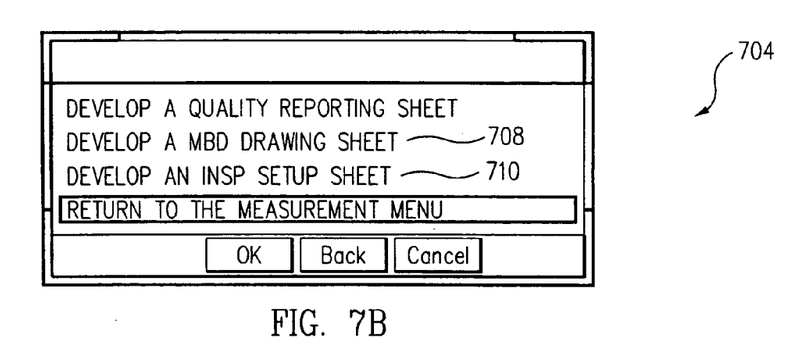
FIG. 7B shows a graphical secondary menu in accordance with an embodiment of the present invention.

Upon selection of the drawing and sketch interface icon button 702, menu 704 appears (FIG. 7B). Menu 704 offers the selection of three programming choices.

Second selection 708 initiates production of a drawing sheet, which shows minimum acceptance criteria for the digital or manual validation process.

Third selection 710 initiates production of an inspection setup sheet, which defines the relationship of measurement and setup geometry to the part. The inspection setup sheet may include a graphical representation of the relationship of the primary, secondary, and tertiary datums and their respective coordinate values and how the datums should be oriented when checking or validating specific parts.

Figure 8A:
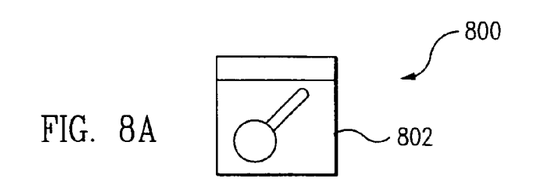
FIG. 8A shows a graphical icon in accordance with an embodiment of the present invention.

FIG. 8A is a representation of one icon 800 from GUI 100 which provides access to modules which provide an interface between Numerically Controlled (NC) Machines and the CMM for the inspection process.

Included within these modules are the capabilities of developing inspection points, unit normals, adding avoidance geometry, probe path simulation & generation, and output for machine specific commands. This is all done for the numeric control fabrication machines if the user does not have access to a CMM.

Figure 8B:
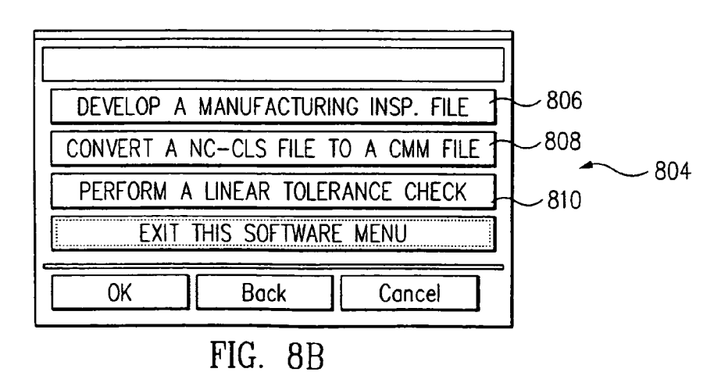
FIG. 8B shows a graphical secondary menu in accordance with an embodiment of the present invention.

Upon selection of the NC machine probe programming module icon button 802, menu 804 appears (FIG. 8B). Menu 804 offers the user a probe programming interface to numeric control machines.

First selection 806 allows the user to develop a manufacturing inspection file from the CAD platform part model. In one embodiment, the module can provide the exemplary automated programming format shown below:

---

TOOLNM/MP700
LOADTOOL/, 1, ADJUST, 1
INSERT G28G91Z0 PROBE
INSERT M06 STYLUS
TOOLNM/T01M06
DISPLY/STYLUS LENGTH IS 2.00
DISPLY/PROBE BALL DIA = .500
SPINDL/RPM, 0.000, NODIR
PAINT/TOOL, FULL, 1
MSYS/ 0.00000, 0.00000, 0.00000
DISPLY/PART MUST BE UN-RESTRAINED FOR INSPECTION
DISPLY/ONE INCH AVOIDANCE GEOMETRY IS INCLUDED
GOTO/0.871, 8.571, −1.007
FEDRAT/POSVEL, IPM, 5

-continued

```
PTMEAS/0.879, 8.571, −0.007, −0.008, 0.000, −1.000
FEDRAT/POSVEL, IPM, 10
GOTO/0.871, 8.571, −1.007
FEDRAT/RAPID
GOTO/0.871, 17.143, −1.007
FEDRAT/POSVEL, IPM, 5
PTMEAS/0.879, 17.143, −0.007, −0.008, 0.000, −1.000
FEDRAT/POSVEL, IPM, 10
GOTO/0.871, 17.143, −1.007
FEDRAT/RAPID
GOTO/0.871, 25.714, −1.007
FEDRAT/POSVEL, IPM, 5
PTMEAS/0.879, 25.714, −0.007, −0.008, 0.000, −1.000
FEDRAT/POSVEL, IPM, 10
GOTO/0.871, 25.714, −1.007
FEDRAT/RAPID
GOTO/0.871, 34.286, −1.007
FEDRAT/RAPID
FINI
```

Second selection 808 allows the user to convert a centerline source file that has been generated by the Computer-Aided Manufacturing (CAM) module of the CAD/CAM platform, namely Unigraphics in the exemplary embodiment, to a coordinate measurement machine formatted inspection data file. A data translator reads the CLS file which may appear as follows:

```
TOOL PATH/POS2-SURF-FIN1A, TOOL, EM1500R750
TLDATA/MILL, 1.5000, 0.7500, 5.0000, 0.0000, 0.0000
MSYS/−142.6926, 726.1066,
−75.7310, 0.1943081, 0.2368110, −0.9519270, 0.0473614,
−0.9715557, −0.2320266
PAINT/PATH
PAINT/FEED
PAINT/COLOR, 4
FEDRAT/IPM, 150.0000
GOTO/
−5.5321, 2.8824, 8.7642, 0.0000000, 0.0000000, 1.0000000
PAINT/COLOR, 1
FEDRAT/50.0000
GOTO/−5.5321, 2.8824, 4.7642
PAINT/COLOR, 6
FEDRAT/10.0000
```

The data translator also converts the NC file to a format that may appear as follows:

```
A1    10.000    10.0000    8.0000
A2    −5.5321    2.8824    8.7642
A3    −5.5321    2.8824    4.7642
A4    −5.5321    2.8824    3.2642
A5    −5.5472    3.1930    3.2106
```

Third selection 810 allows the user to perform a linear tolerance check. This sub-routine will perform a linear tolerance stack check based upon a keyed in numeric tolerance from a series of selected data points within the measurement file.

Figure 9:
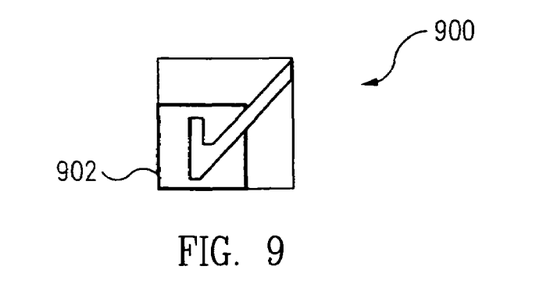
FIG. 9 shows a graphical icon in accordance with an embodiment of the present invention.

FIG. 9 is a representation of one icon 900 from GUI 100 which provides access to a module which provides functionality to develop a Quality Planning Instruction Sheet (QPIS). Selection of icon button 902 causes the module to generate ASCII formatted text documents which can be used as an aid to the execution of an inspection process—electronic, mixed, or manual.

In one embodiment, the QPIS file is developed as shown below. Each one of these routines provides inspection points and unit normal vector cosine values.

| | | | | |
|---|---|---|---|---|
| df | 1 | −169.8027 | 679.7425 | 127.1585 |
| — | | .3528 | −.8633 | .3609 |
| df | 2 | −168.6217 | 680.7308 | 129.3272 |
| — | | .2188 | −.9626 | .1598 |
| df | 3 | −167.0821 | 681.0756 | 131.4430 |
| — | | .0705 | −.9962 | −.0512 |
| df | 4 | −165.2948 | 680.7561 | 133.3871 |
| — | | −.0829 | −.9622 | −.2593 |
| df | 5 | −163.4216 | 679.7944 | 135.0385 |
| — | | −.2301 | −.8634 | −.4490 |
| df | 6 | −161.5726 | 678.1933 | 136.3594 |
| — | | −.3656 | −.7006 | −.6128 |
| df | 7 | −160.1117 | 676.0937 | 137.3060 |
| — | | −.4739 | −.4898 | −.7318 |
| df | 8 | −159.1460 | 673.6347 | 137.8413 |
| — | | −.5488 | −.2452 | −.7992 |

Figure 10A:
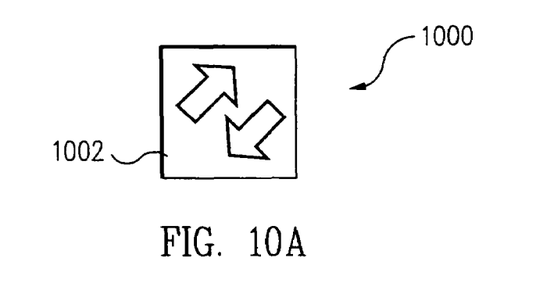
FIG. 10A shows a graphical icon in accordance with an embodiment of the present invention.

FIG. 10A is a representation of one icon 1000 from GUI 100 which provides access to modules which provide Read/Write Data Points for Analysis. This functionality provides the ability to read or write point data with alpha-numeric label recognition from or to a file that is compatible with the CAD environment. It also provides the capability to read information into the CAD platform from any type of numerically based measurement system outfile.

When reading data files into the CAD platform, the data text file can reside within the user directory path or the current active directory path of the workstation. The software program of the present invention being used with the Unigraphics CAD environment can be formatted so that point data from other associative computer aided design systems, measuring devices, and data sets can be recognized for input. The modules include routines which offer dataset rigging options to properly position the dataset within the file or CAD environment.

Figure 10B:
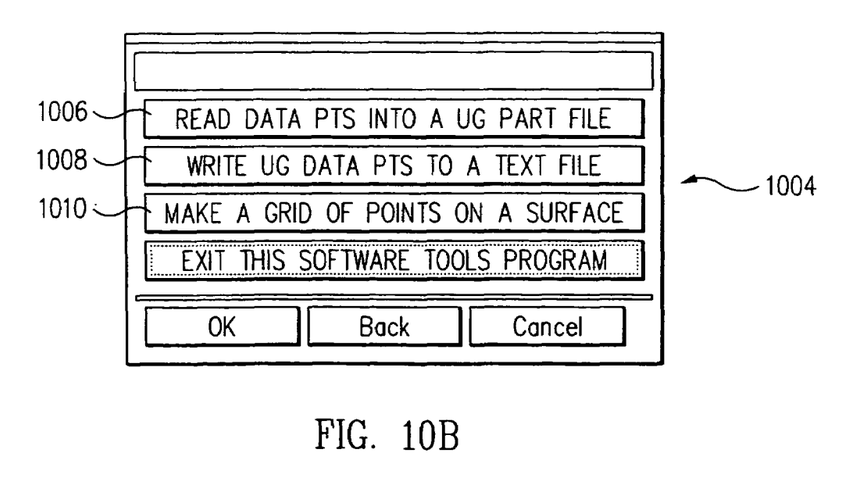
FIG. 10B shows a graphical secondary menu in accordance with an embodiment of the present invention.

Upon selection of the data exchange module icon button 1002, data exchange menu 1004 appears (FIG. 10B). Data exchange menu 1004 offers three user selections.

First selection 1006 initiates the reading of a data set file of points into the CAD environment, such as the Unigraphics platform. Second selection 1008 initiates the writing of a set of selected points out of the UG CAD environment to a dataset. A dataset of digital points is written within the CAD model out to an ASCII text file to be used for the inspection, validation, or statistical process control methods.

Third selection 1010 initiates the making of a grid of data points on a surface based upon the U-V parameters of the selected surface. U and V may be described parametrically in terms of two independent parameters u and v. Restricting these parameters to a finite range, such as: $0<=u<=1$, $0<=v<=1$, will define a finite patch or inspection parameter on the surface.

Initially, the user is prompted to select a surface on which the points are to be generated. The command can be used for Mesh-2, Mesh-6, Bezier surfaces and solids and the like.

After the user has selected the desired surface or solid to generate a grid of measurement points upon, the user is prompted to enter the number of points to be used to create the grid along the U and V surface grid parameters. The U and V mapping is based upon the mesh construction of the original surface development grid.

Once the system has generated the requested grid pattern on the selected surface, the user is prompted to select more surfaces to generate grid patterns upon or to exit to the main menu.

The output is automatic for this routine. The following is a sample of the outfile:

| 72.658 | 1808.940 | 313.538 |
|--------|----------|---------|
| 72.861 | 1809.751 | 313.574 |
| 73.063 | 1810.563 | 313.610 |
| 73.265 | 1811.374 | 313.645 |
| 73.923 | 1806.184 | 311.911 |
| 74.070 | 1807.448 | 311.961 |
| 74.217 | 1808.712 | 312.011 |
| 74.363 | 1809.977 | 312.062 |
| 74.971 | 1803.871 | 309.696 |
| 74.986 | 1805.604 | 309.801 |
| 75.001 | 1807.337 | 309.907 |
| 75.017 | 1809.070 | 310.013 |
| 74.413 | 1805.754 | 307.324 |
| 74.493 | 1807.068 | 307.503 |
| 74.574 | 1808.383 | 307.682 |

Figure 11:
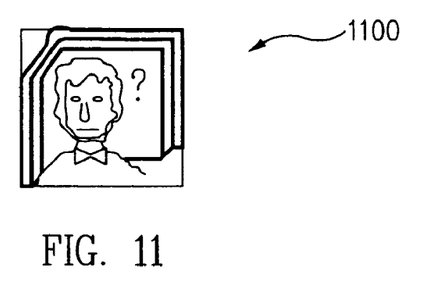
FIGS. 11, 12 and 13 each show a graphical icon in accordance with an embodiment of the present invention.

The number of points generated were: 15
5 rows in the U-direction
3 rows in the V-direction
end of listing
END of FILE FIG. 11 is a representation of one icon 1100 from GUI 100 which aids in the effective use of the CA-QA Software Package, the CA-QA Change Request Module, and User Support Tools.

Figure 12:
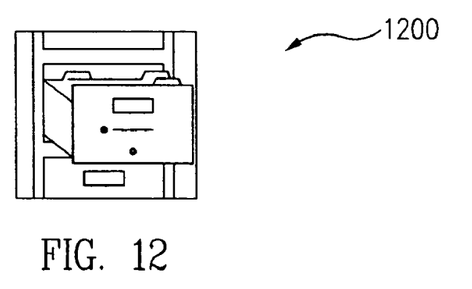

FIG. 12 is a representation of one icon 1200 from GUI 100 which aids in the effective filing of all of the files generated and developed while using the present invention. The CA-QA software system causes files to be stored in associative hierarchical directories that are constructed automatically by the software modules with the same basic nomenclature as the part file name followed by the software module extension noted by each routine. (e.g.: _CMM, _ANALYSIS, etc)

The directories are made to reside locally on the C:\ drive of the User's computer. However, it is known that the user can change the drive letter from the default C:\ to another if desired. One default file is always generated within this directory titled "history.file" that logs all the sub-routines that are used during the CA-QA software system session.

Through the Files and Maintenance module the user can perform the following:

1) Develop an associative Parent Directory entitled Quality on any specified drive.

2) Develop a linked sub-directory within the Parent directory with the nomenclature of the part filename.

3) Develop an associative web-based reporting file system based upon part numbers.

Figure 13:
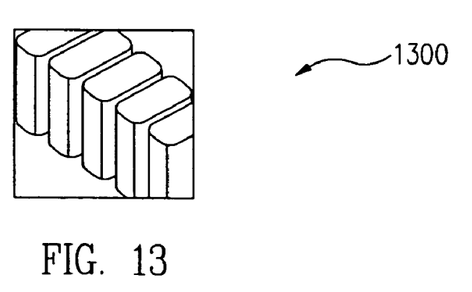

FIG. 13 is a representation of one icon 1300 from GUI 100 which provides a tool to aid with ISO compliancy standards in the event that a user does not have an ISO compliant quality system. The module is configured to allow the user to customize the set of processes to work with the user's internal business applications.

Figures 14, 14A:
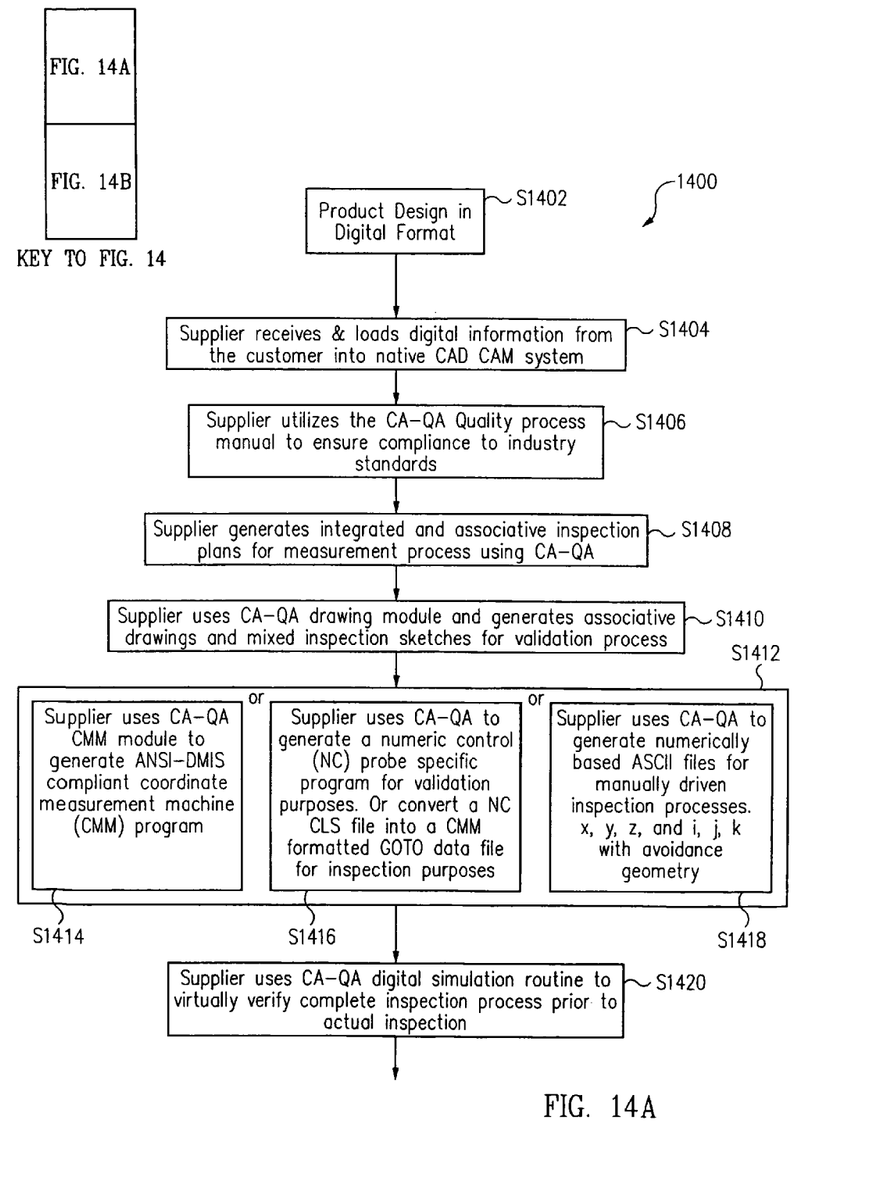
FIGS. 14A and 14B show flowchart indicating a method of the present invention.
Figure 14B:
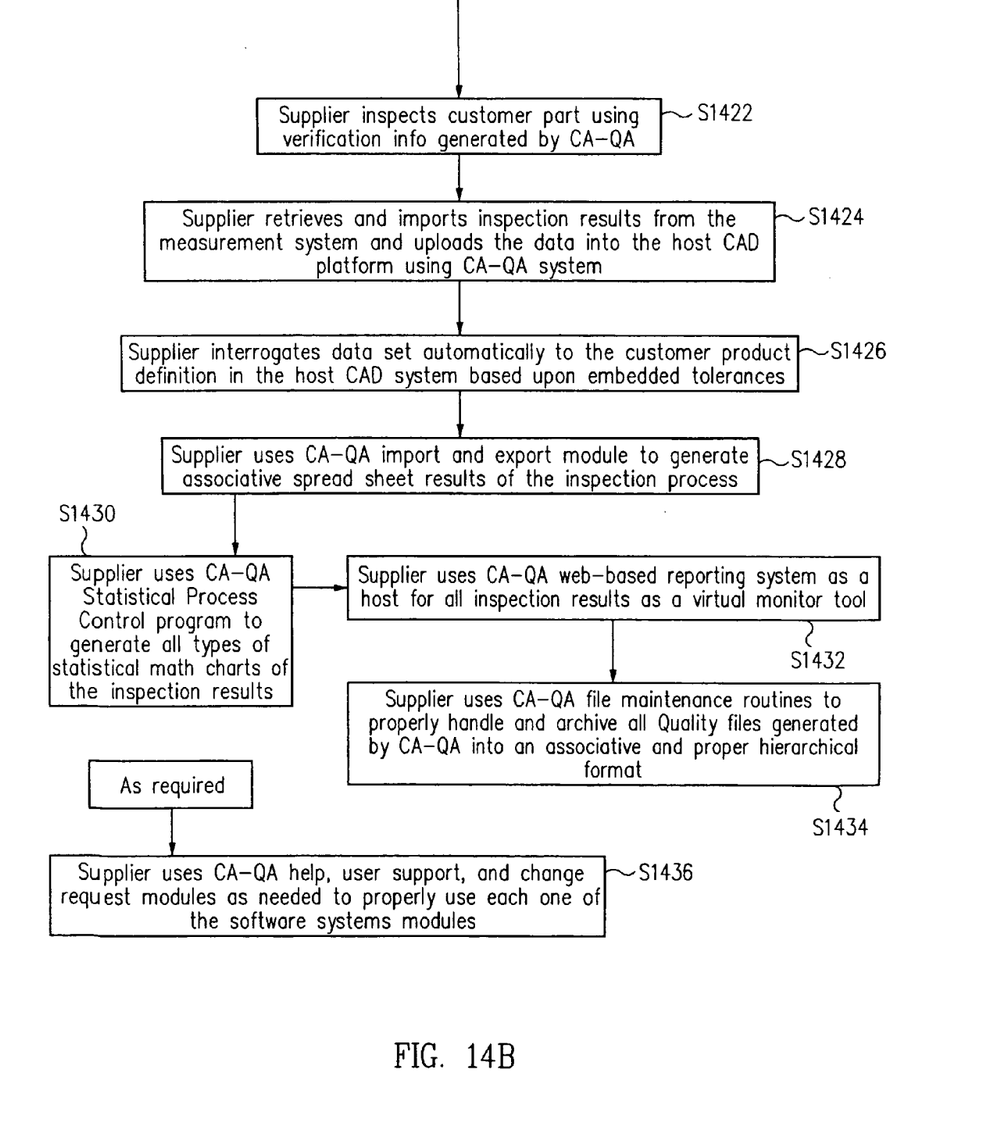

FIG. 14 is a flowchart indicating an embodiment of the present invention incorporating use of the modules and routines hereinbefore described. The embodiment described below assumes that the CA-QA software system has been configured to be embedded within a native CAD/CAM software platform, such that each module hereinbefore described has been configured to work directly with the native CAD/CAM software system in accordance with an embodiment of the present invention.

In this embodiment, a process 1400 is provided for inspecting a manufactured part or product. The product to be manufactured is supplied by a customer, in digital format (i.e. digital definition), to a supplier, manufacturer, and the like (s1402). The supplier receives and loads the digital definition received from the customer into a native CAD/CAM platform (s1404). The native CAD/CAM platform can include any CAD/CAM platform, such as Unigraphics, CATIA or PRO-E.

The supplier uses the CA-QA software system process manual to ensure that the digital definition is in compliance with industry standards (s1406). The supplier generates integrated and associative inspection plans for the measurement process using the CA-QA software system modules and routines (s1408).

The CA-QA software system provides the supplier use of the drawing module to generate associative drawings and mixed inspection sketches for use, as needed, in the validation process (s1410).

Once the inspection plans for the measurement process are complete, or, alternatively, simultaneous with the development of the inspection plans, an inspection program is generated (s1412), which is capable of controlling a CMM.

The CA-QA embedded in the CAD/CAM platform provides three options for controlling the CMM. One option is for the supplier to use the CA-QA CMM module to generate an ANSI—DMIS CMM program code which corresponds with the inspection plan (s1414). Another option available is for the supplier to use the CA-QA software system to generate a numeric control (NC) probe specific program for validation purposes (s1416). Alternatively, the supplier can convert a NC CLS file into a CMM formatted GOTO data file for inspection purposes. A third option is for the supplier to use the CA-QA software system to generate numerically based ASCII files for manually driven inspection processes using x, y, z and i, j, k with avoidance geometry (s1418).

Once the CMM code is generated, the supplier can use the CA-QA software system to create a digital simulation routine. The simulation routine uses a virtual (digitally reproduced) probe to virtually inspect the subject part or product and verify the complete inspection process prior to the actual physical inspection (s1420). In this manner, the supplier can determine if the inspection plan has been accurately implemented before the CMM performs the physical inspection of the part or product. This reduces or eliminates the possibility that the inspection plan is inaccurate, that the inspection code is faulty or that the operator has made an error in some other related area of the inspection process.

Next, the supplier can physically inspect the customer's part using the CMM or similar device using the verification info generated by the CA-QA software system (s1422).

The CMM generates a data package including the results of the physical inspection. The supplier can retrieve and import the inspection results from the CMM system. The inspection results data package is uploaded into the host CAD/CAM platform using the embedded CA-QA software system (s1424).

The supplier can use the CMM data package to compare to the customer's product digital definition being stored in the native host CAD/CAM system. The comparison can be based on any selected parameter that can be used to verify inspection results by generating a number representing the deviation between the compared data. For example, in one embodiment, the comparison of the two sets of data can be based upon user embedded deviation tolerances related to a particular dimension.

The CA-QA software system provides the supplier use of an import and export module to generate associative spread sheet results of the inspection process (s1428). The spreadsheets include the deviation data that is generated when the digital definition of the original part or product is compared to the inspection results data.

The CA-QA software system provides the supplier use of a statistical process control module to generate all types of statistical math charts of the inspection results (s1430). The supplier can also use the CA-QA software system to provide web-based reporting using the web-based reporting system. The web-based reporting system can host all inspection results so that a customer can view the results and virtually monitor the inspection process (s1432).

The CA-QA software system provides the supplier file maintenance modules and routines, which can properly handle and archive all quality files generated by the CA-QA software system into an associative and proper hierarchical format (s1434).

As shown in FIG. 14, the CA-QA software system includes CA-QA Help, user support, and change request modules to aid the user in the proper use of each one of the software system modules (s1436). The Help module can be accessed, as required, at any time during the use of the CA-QA software.

The detailed description herein is presented largely in terms of processes and symbolic representations of operations performed by conventional computers. A computer may be any microprocessor or processor (hereinafter referred to as processor) controlled device, including terminal devices, such as personal computers, workstations, servers, clients, mini-computers, main-frame computers, laptop computers, a network of one or more computers, mobile computers, portable computers, or any combination thereof.

The computer may possess input devices such as, by way of example, a keyboard, a keypad, a mouse, a microphone, or a touch screen, and output devices such as a computer screen, display, printer, or a speaker. Additionally, the computer includes memory such as a memory storage device or an addressable storage medium.

The computer memory may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be understood, however, that these and some other terms should be associated with appropriate physical quantities for computer operations and that these terms are merely conventional labels applied to physical quantities that exist within and during operation of the computer.

It should be understood that manipulations within the computer are often referred to in terms of adding, comparing, moving, searching, and the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM) or programs stored on machine-readable medium, such as a floppy disk, a CD, a DVD, or other recordable medium or memory device for storing the software. The machine-readable medium being operable by a computer or other device suitable to execute the software stored by the machine-readable medium.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for inspecting a product comprising;
   receiving a first data package including a first digital definition of said product;
   merging said first data package into a native computer aided drafting (CAD) platform;
   generating an integrated inspection plan for said first digital definition;
   generating an inspection program routine based on said integrated inspection plan;
   instructing a coordinate measurement machine (CMM) to perform a measurement process based upon said generated program;
   interrogating a manufactured version of said product in response to said inspection plan routine;
   receiving a second data package generated by said CMM in response to said interrogation;
   merging said second data package into said native CAD platform; and comparing said first data package to said second data package to determine a level of deviation between said first data package and said second data package.

2. The method of claim 1, wherein said merging said first data package into said native CAD platform comprises merging without translation of said first digital definition.

3. The method of claim 1, wherein said generating said integrated inspection plan for said first digital definition comprises establishing inspection criteria for said product.

4. The method of claim 1, wherein said generating an inspection program routine comprises generating a machine code for controlling said CMM to perform said inspection plan.

5. The method of claim 1, wherein said generating said integrated inspection plan and said generating said inspection program routine occur approximately simultaneously.

6. The method of claim 1, wherein said merging said second data package into said native CAD platform comprises transforming data from said second data package into a preselected coordinate system.

7. The method of claim 1, wherein said comparing said first data package to said second data comprises performing a statistical analysis of said deviation based on a predetermined tolerance.

8. The method of claim 1, further comprising displaying said first digital definition and data from said second data package simultaneously on a digital display screen.

9. The method of claim 1, further comprising:
receiving a second data package including a second digital definition of said product;
merging said second data package into said native CAD platform;
updating said integrated inspection plan automatically based on said second digital definition; and
updating said inspection plan routine automatically based on said updated integrated inspection plan.

10. An inspection system for inspecting a product comprising:
a computer memory; and
a computer processor, said memory having loaded thereon a quality assurance software system embedded into a native computer aided drafting (CAD) platform configured in conjunction with said processor to:
receive a first data package including a first digital definition of said product;
generate an integrated inspection plan for said first digital definition;
generate an inspection plan routine based on said integrated inspection plan;
instruct a coordinate measurement machine (CMM) to perform an interrogation of a manufactured version of said product in response to said inspection plan routine;
receive a second data package generated by said CMM in response to said interrogation;
merge said second data package into said native CAD platform; and
compare said first data package to said second data package to determine a level of deviation between said first data package and said second data package.

11. The system of claim 10, wherein to generate said integrated inspection plan for said first digital definition comprises establishing inspection criteria for said subject product.

12. The system of claim 10, wherein to generate an inspection plan routine comprises to generate a machine code for controlling said CMM to perform said inspection plan.

13. The system of claim 10, wherein said quality assurance software system embedded into said native CAD platform is configured to generate said integrated inspection plan and to generate said inspection program routine approximately simultaneously.

14. The system of claim 10, wherein to compare said first data package to said second data package comprises performing a statistical analysis of said deviation based on a predetermined tolerance.

15. The system of claim 10, wherein said quality assurance software system embedded into said native CAD platform is further configured to display said first digital definition and data from said second data package simultaneously on a digital display screen.

16. The system of claim 10, wherein said quality assurance software system embedded into said native CAD platform is further configured to:
receive a second data package including a second digital definition of said product;
merge said second data package into said native CAD platform;
update said integrated inspection plan automatically based on said second digital definition; and
update said inspection plan routine automatically based on said updated integrated inspection plan.

17. A system for inspecting a product comprising:
a native computer aided drafting (CAD) platform; and
a quality assurance software system configured to operate as an integral part of said CAD platform, said quality assurance software system configured to:
receive a first data package including a first digital definition of said product;
generate an integrated inspection plan for said first digital definition;
generate an inspection plan routine based on said integrated inspection plan;
instruct a coordinate measurement machine (CMM) to perform an interrogation of a manufactured version of said product in response to said inspection plan routine;
receive a second data package generated by said CMM in response to said interrogation;
merge said second data package into said native CAD platform; and
compare said first data package to said second data package to determine a level of deviation between said first data package and said second data package.

18. The system of claim 17, wherein said quality assurance software system is further configured to:
receive a second data package including a second digital definition of said product;
merge said second data package into said native CAD platform;
update said integrated inspection plan automatically based on said second digital definition; and
update said inspection plan routine automatically based on said updated integrated inspection plan.

19. A machine-readable medium having stored instructions which are executable by a processor for performing a method comprising:
receiving a first data package including a first digital definition of a subject product;

merging said first data package into a native computer aided drafting (CAD) platform;

generating an integrated inspection plan for said first digital definition;

generating an inspection program routine based on said integrated inspection plan;

instructing a coordinate measurement machine (CMM) to perform a measurement process based upon said generated program;

interrogation of a manufactured version of said subject product in response to said inspection plan routine;

receiving a second data package generated by said CMM in response to said interrogation;

merging said second data package into said native CAD platform; and comparing said first data package to said second data package to determine a level of deviation between said first data package and said second data package.

20. A processor adapted to provide software to a remote processor, said software including steps executable by said remote processor for performing a method comprising:

receiving a first data package including a first digital definition of a subject product;

merging said first data package into a native computer aided drafting (CAD) platform;

generating an integrated inspection plan for said first digital definition;

generating an inspection program routine based on said integrated inspection plan;

instructing a coordinate measurement machine (CMM) to perform a measurement process based upon said generated program;

interrogation of a manufactured version of said subject product in response to said inspection plan routine;

receiving a second data package generated by said CMM in response to said interrogation;

merging said second data package into said native CAD platform; and comparing said first data package to said second data package to determine a level of deviation between said first data package and said second data package.

\* \* \* \* \*